United States Patent [19]

Pessia et al.

[11] Patent Number: 5,054,054
[45] Date of Patent: Oct. 1, 1991

[54] VOICE APPLICATIONS GENERATOR

[75] Inventors: Dario Pessia, Sunnyvale; Ralf Gliemer, Santa Clara, both of Calif.

[73] Assignee: International Business Machines Corporation, Armonk, N.Y.

[21] Appl. No.: 307,429

[22] Filed: Feb. 7, 1989

[51] Int. Cl.$^5$ .............................................. H04M 3/50
[52] U.S. Cl. ........................................ 379/89; 379/67; 379/97; 379/201
[58] Field of Search .................... 379/89, 88, 67, 201, 379/97

[56] References Cited

U.S. PATENT DOCUMENTS

| | | | |
|---|---|---|---|
| 4,523,055 | 6/1985 | Hohl et al. | 379/89 |
| 4,580,012 | 4/1986 | Matthews et al. | 379/245 |
| 4,585,906 | 4/1986 | Matthews et al. | 379/88 |
| 4,611,094 | 9/1986 | Asmuth et al. | 379/89 |
| 4,640,991 | 2/1987 | Matthews et al. | 379/88 |
| 4,695,977 | 9/1987 | Hansen et al. | 364/900 |
| 4,697,282 | 9/1987 | Winter et al. | 379/67 |
| 4,766,604 | 8/1988 | Axberg | 379/67 |
| 4,782,517 | 11/1988 | Bernardis et al. | 379/201 |
| 4,783,796 | 11/1988 | Ladd | 379/67 |
| 4,785,408 | 11/1988 | Britton et al. | 364/513.5 |
| 4,878,240 | 10/1989 | Lin et al. | 379/67 |
| 4,897,866 | 1/1990 | Majmudor et al. | 379/94 |

Primary Examiner—Thomas W. Brown
Attorney, Agent, or Firm—Perman & Green

[57] ABSTRACT

Apparatus and method for performing at least one voice related application, the apparatus including a state table memory 62 for storing information expressive of at least two states 64. The states are entered into the state table memory by a state generator 68 during interaction with a voice applications writer. Each of the states includes at least an identification of the state, an identification of an action to be performed by the execution of the state and an identification of at least one state to be executed next upon a termination of the action. The apparatus further includes a state machine 60 for reading information expressive of a state from the state table memory and for invoking the identified action 66. The state machine includes an input for receiving a signal, or edge, from the invoked action indicative of a termination of the action and, responsive to the reception of the signal, determines the identification of a next state to be read and executed. Certain of the actions are actions which receive audio signals from or which transmit audio signals to a digital or an analog voice trunk coupled to a phone switching apparatus.

16 Claims, 4 Drawing Sheets

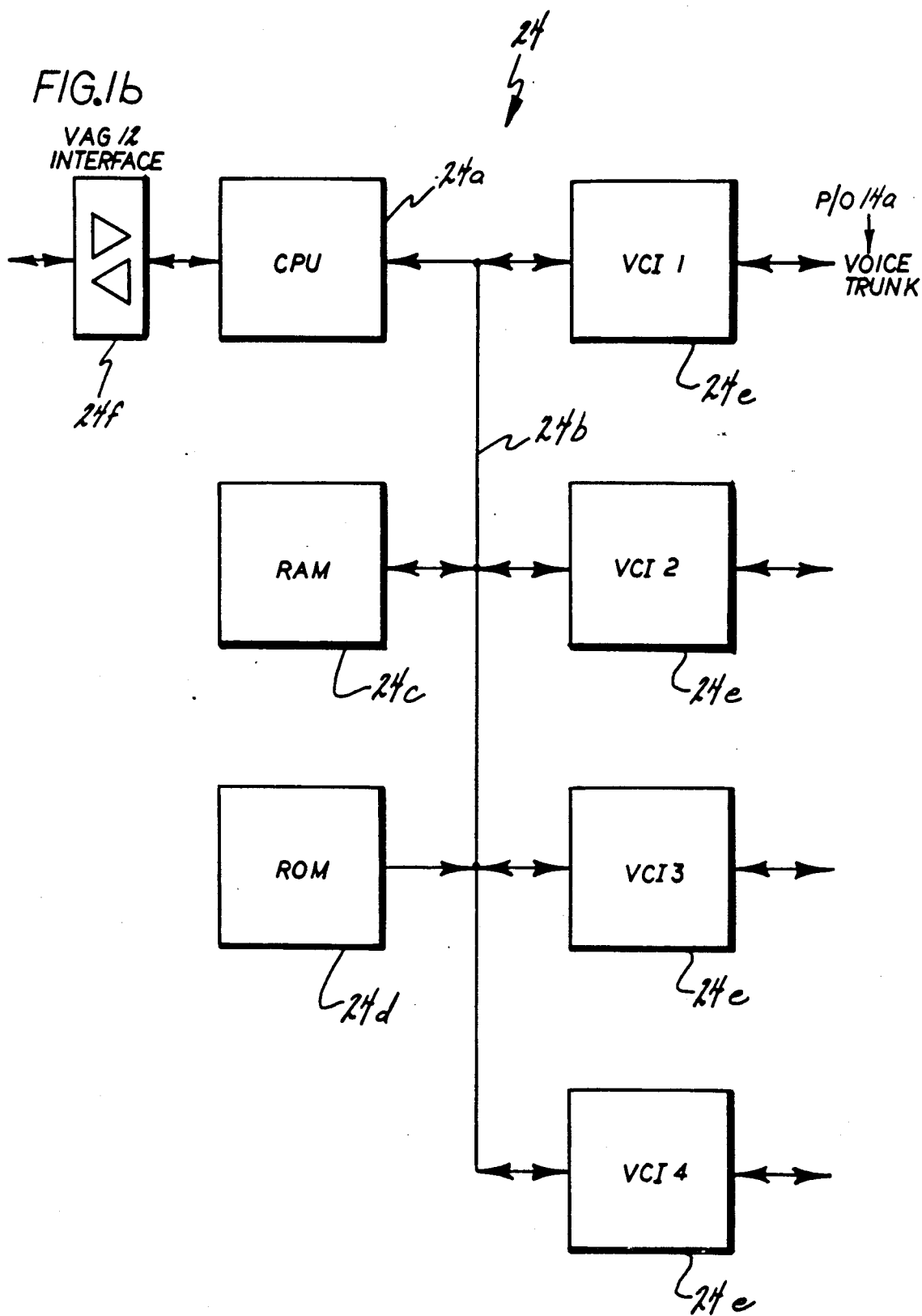

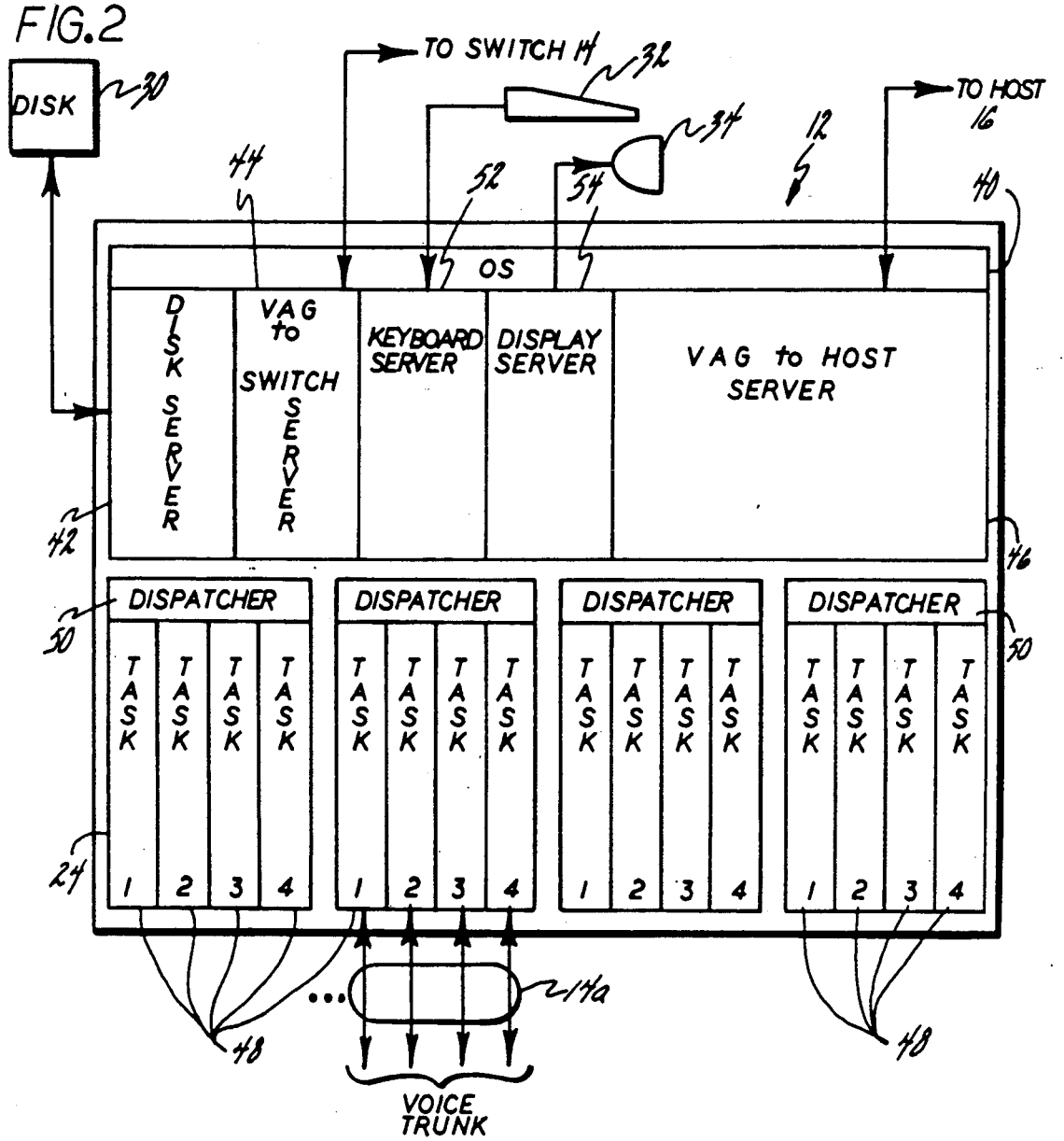

VOICE APPLICATIONS GENERATOR

FIELD OF THE INVENTION

This invention relates generally to information processing systems having a voice response capability and, in particular, to a state driven voice applications generator having an application definition interface which facilitates the creation of a voice response application by a user.

BACKGROUND OF THE INVENTION

Information processing systems having a voice generating capability are presently employed as answering machines, voice messaging systems, voice response units and in general as intelligent peripherals. The voice signal may be prerecorded on audio tape or may be digitized, compressed and stored, for example, on a magnetic disk.

A typical application couples the information processing system to one or more phone lines, the system detecting the occurrence of a ring signal and answering the phone. Often a standard prompt voice message is sent to the phone line. Depending on the type of system the caller may depress certain buttons on a Touch-Tone phone set in order to inform the system of a specific type of action desired by the user. For example, after hearing the initial prompt the user may depress a specific button in order to signal the system to play back any stored voice messages intended for the caller. Other more sophisticated interactions can also be accomplished. For example, the information processing system may have access to a large data base, such as a data base containing stock quotations. The caller may signal the system to access one or more quotations from the data base whereafter the system converts the quotation to an audio voice signal which is output to the caller's phone line.

As can be appreciated, for such systems the interaction between a caller and the system may become quite complex. As a relatively simple example, if the caller desires to learn if any voice messages are stored for the caller the system may respond with a voice signal such as "you have three new voice messages". In generating this response the number "three" is a variable which is determinable at the time that the caller is connected to the system. Furthermore, the word "messages" is also a variable in that if only one voice message is pending the singular form "message" should be returned and not the plural form.

It can thus be appreciated that the ability to accurately define a series of system responses to an incoming call is an important aspect of such a voice response system. Also, it is preferable that a voice applications writer be able to create and modify the system responses in a relatively uncomplicated and time efficient manner. That is, the operator of the system should be able to interact with the voice response system to create and modify voice responses in a manner which does not require the direct assistance of the provider of the system or the direct assistance of skilled programming personnel.

SUMMARY OF THE INVENTION

In accordance with the invention a voice applications generator includes a state driven machine to process predetermined states stored within a state table in order to determine a next action to be accomplished during a voice application. The voice applications generator further includes a voice application definition interface with a voice applications writer, the interface employing a state machine model having state definitions that are intuitively meaningful to the applications writer.

The invention further provides apparatus for performing at least one voice related application, the apparatus including a state table memory for storing information expressive of at least two states. Each of the states includes at least an identification of the state, an identification of an action to be performed by the execution of the state and an identification of at least one state to be executed next upon a termination of the action. The apparatus further includes a state machine for reading information expressive of a state from the state table memory and for invoking the identified action. The state machine includes an input for receiving a signal from the invoked action indicative of a termination of the action and, responsive to the reception of the signal, determines the identification of a next state to be read and executed.

The invention further provides a method of executing a voice related application. The method has an initial step of storing within a state table memory at least two data structures, each of the data structures including fields expressive of a particular state of the application. These fields include a state identification field, an action field and an identification field of at least one next state to be executed upon the termination of the action. The method of the invention further includes the steps of (a) reading a data structure from the state table memory, (b) invoking an action specified by the action field, (c) identifying a value returned by the action when the action terminates, (d) determining from the identified value an identification of a next state to be read from the state table memory and (e) reading from the state table memory the data structure associated with the determined next state.

BRIEF DESCRIPTION OF THE DRAWING

The above set forth and other features of the invention will be made more apparent in the ensuing Detailed Description of the Invention when read in conjunction with the attached Drawing, wherein:

FIG. 1b is a block diagram of an Enhanced Voice Unit (EVU) 24;

FIG. 2 is a block diagram which shows in greater detail a logical organization of the voice applications generator;

FIG. 4 shows the logical organization of a state which is input to the state machine from the state table.

DETAILED DESCRIPTION OF THE INVENTION

Figure 1A:
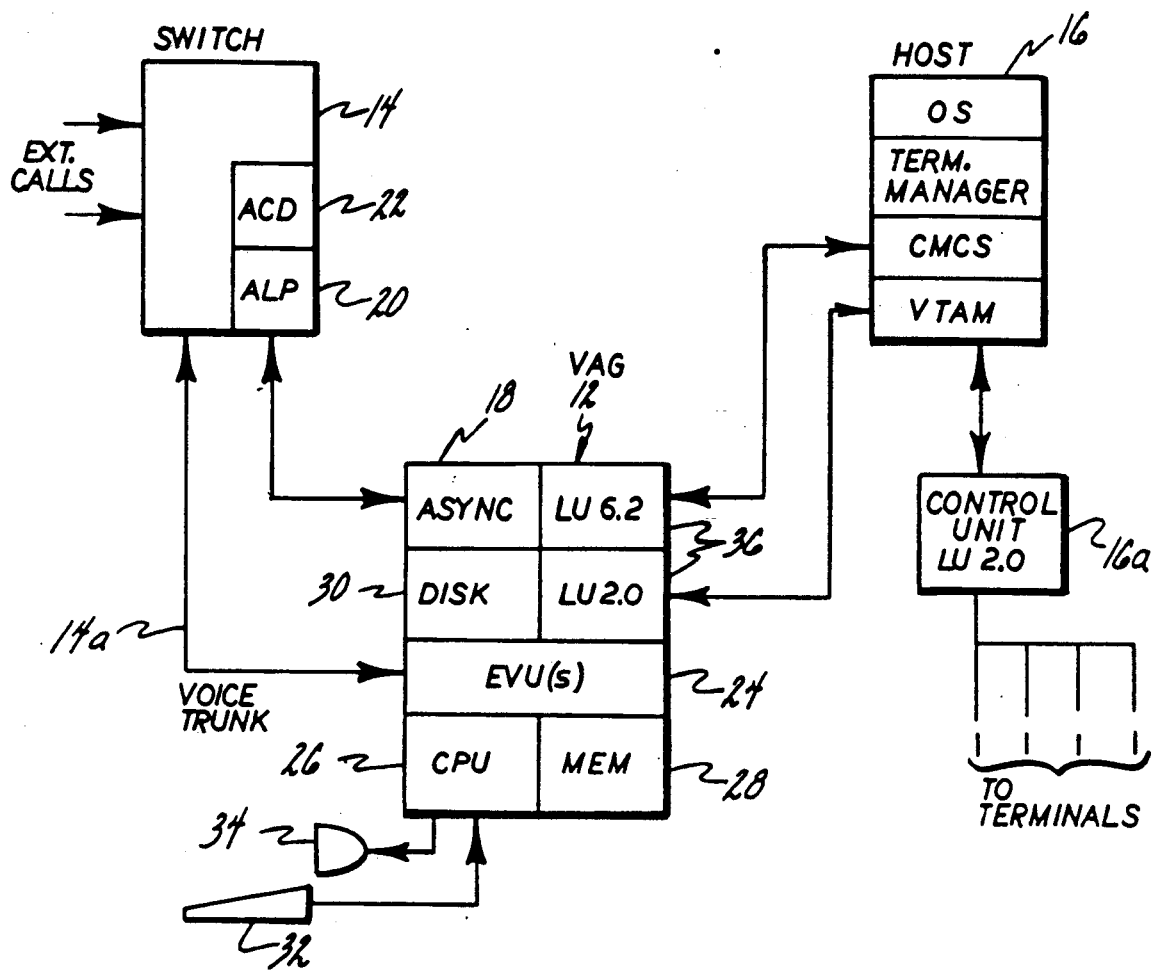
FIG. 1a is a block diagram of the voice applications generator of the invention which is interposed between a phone switching device and a host system.

Referring now to FIG. 1 there is shown an overall block diagram of an information processing system 10 which includes a voice applications generator (VAG) 12 which is bidirectionally coupled to a phone switch 14 and also possibly to a host system 16. It should be realized that the host system 16 may or may not be provided depending upon the application. For example, in a system wherein a caller requires information which is stored in a large data base, such as the aforementioned stock quotations, the host system provides access to the data base. For many applications such as a voice messaging or an answering machine service the host system may not be required, the VAG 12 instead functioning in a stand alone manner with the switch 14.

VAG 12, in a presently preferred embodiment of the invention, comprises a PS/2 computer which operates under an operating system (OS) known as OS/2 Extended Edition. The switch 14 may be one of a number of known types, such as a type known as a 9750, manufactured by Rolm Systems, Santa Clara, Calif. The host 16, if provided, may be an IBM 370 having 3270 type-terminals. However, it should be realized that the teaching of the invention is applicable to a wide variety of different types of systems and is not to be construed to be limited to only the embodiment disclosed herein.

VAG 12 includes an asynchronous (ASYNC) port 18 coupled to an automatic link processor (ALP) 20 and an automatic call distributor (ACD) 22 which are contained within the switch 14. VAG 12 further includes an enhanced voice unit (EVU) 24 which is coupled via an analog or a digital voice trunk 14a to the switch 14. The VAG 12 further includes a CPU 26 having an associated program and data memory 28. A mass storage device such as a magnetic disk 30 is also provided for storing data and also instructions for execution by the CPU 26. These instruction include instructions associated with the OS/2 operating system. The disk 30 may also store digitized and compressed segments of an audio voice signal. The VAG 12 also has a data entry means such as a keyboard 32 and a data output means such as a CRT terminal 34 for interaction with an operator of the VAG 12, such as a voice applications writer. The VAG 12, for those applications which include interaction with the host 16, includes interface circuitry 36 whereby the VAG 12 appears as a terminal, such as a 3270 type-terminal, to the host 16. The host 16 typically includes an operating system, terminal manager and access to mass storage devices either directly or via a network. Other terminals may also be serviced by the host 16 via a control unit 16a.

Referring to FIG. 1b there is shown in block diagram form the EVU 24 of FIG. 1a. The EVU 24 can be seen to include a CPU 24a having a bus 24b which couples the CPU 24a to other devices. These other devices include RAM 24c, ROM 24d and a plurality of voice channel interface (VCI) units 24e. In this illustrated embodiment of the invention each EVU 24 includes four VCIs 24e, each of which is coupled via known types of circuitry to one voice line of the voice trunk 14a. CPU 24a is coupled to the VAG 12 via a bus interface logic block 24f. The EVU 24 is packaged as a self-contained printed circuit board which plugs into the bus structure of the VAG 12. Of course, FIG. 1b illustrates but one possible embodiment of the EVU 24. For example, other embodiments may contain more or less VCIs 24e.

Referring now to FIG. 2 there is shown in block diagram form a logical organization of the VAG 12. VAG 12 can be seen to include an operating system 40, such as OS/2 Extended Edition, a disk server 42 for communication with a mass storage device wherein digitized voice signals and other information are stored; a telecommunications switch server 44 and a host server 46. A keyboard server 52 and a display server 54 are also provided. In the illustrated embodiment of the invention each VAG 12 further includes up to four of the EVUs 24, each of which is coupled to up to four voice lines from the switch 14. Interaction with each of the four voice lines may be considered as a separate application or task 48 capable of substantially concurrent execution under an associated task dispatcher 50. The task and dispatching functions are preferably implemented by programs stored within and executed from the RAM 24c and ROM 24d. As such, it can be seen that each EVU 24 functions as a multitasking coprocessor within the VAG 12.

Each of the tasks 48 performs at least a voice response task which is predefined by the voice applications writer. Each task 48, at any given time during the operation of the system, can be considered to be in one of a possibly large number of states. These states include, by example, a WaitforCall state, a Playprompt state and a GetKey state. Each task begins in the WaitforCall state and returns to this state at the termination of an interaction with a caller. It should be noted that all of the tasks 48 of one or more of the EVUs 24 may be directed towards the same type of application, such as voice messaging, or one or more of the tasks may be directed towards a different application. For example, one of the tasks 48 may implement a voice messaging system while another task 48 associated with the same EVU 24 may implement a phone answering machine.

Figure 3:
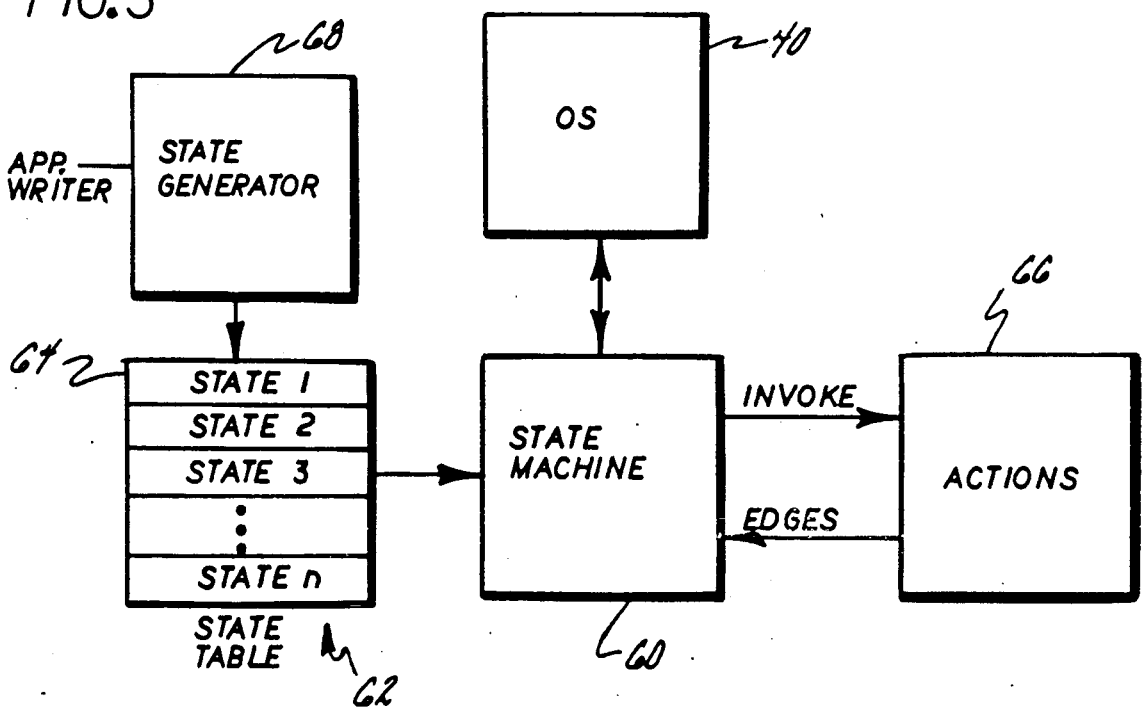
FIG. 3 is a block diagram which shows the state machine of the voice applications generator and the relationship of the state machine to an operating system, state table and the actions which are invoked by the state machine.

Referring now to FIG. 3 there is shown the state driven architecture of each of the tasks 48. In order to define and control the transition of a task 48 through the various states the VAG 12, and more specifically the EVU 24, includes for each of the tasks 48 a state machine 60. The state machine 60 is coupled to an associated state table 62 memory wherein are stored at least two data structures representing states 64. The state machine 60 is further shown having an output coupled to an action block 66 for initiating actions based upon the contents of the state table 62. The state machine 60 further has an input coupled to the actions 66 for receiving "edges" therefrom, the edges serving to drive the state machine 60 from one state to another in a manner which is described below. The state machine 60 is further bidirectionally coupled to the operating system 40 whereby the state machine 60 gains access, via the various device servers, to system resources such as the disk 30 or host 16 communication. Bidirectionally coupled to the state table 62 is a state generator 68 which interacts with an applications writer via the keyboard server 52 and display server 54 to create, store, revise and review the plurality of states 64.

Referring now to FIG. 4 there is shown a logical view of one of states 64. Each state 64 is comprised of fields for conveying information, the information within various fields being supplied by the voice applications writer during interaction with the state generator 68 of FIG. 3.

A Purpose field 70 is optionally filled in by the voice applications writer and functions as does a comment field in most programming languages. That is, this field conveys information to the applications writer, such as a reminder of the purpose of the state, but the information is not processed or otherwise used by the state machine 60.

A State Number field 72 permits the application writer to assign a logical number to each particular state which uniquely identifies the state. During application generation the state generator 68 prompts the application writer to enter a state number when modifying, displaying, adding or deleting a state.

The Action field 74 contains the name of the specific action which is called by the state. As an example, the Action field 74 may call the action GetKey which returns to the state machine 60 the identification of a key on a Touch-Tone phoneset which is depressed by a caller. This returned value is a signal, or "edge", which drives the state machine 60 to a next state.

The Parameter field 76 contains one or more parameters which are passed to the action when the action is called. By example, some actions, such as WaitforCall, have no parameters associated therewith. The action PlayPrompt has one parameter which identifies a number of a specific pre-recorded prompt to be played by the action.

The Edge Value field 78 contain a number of possible edge values which may be returned by an action to the state machine 60. In accordance with the example of data entry through a Touch-Tone phone keypad there are 15 possible edges, namely 0 through 9, *, #, T1, T2 and Hup. The digits 0–9 and the characters "*" and "#" represent the standard keypad keys of the phone. The remaining three edges, T1 and T2 and Hup, are indicative of called status. T1 is an edge returned when a timeout occurs; for example, nothing is entered by the caller after a predetermined interval of time. T2 is an edge returned when a predetermined number of timeouts (T1) occur. Hup indicates that the caller has hung up the phone. For the GetKey action the returned edge value is the identification of the key pressed on the phone keypad or one of the caller status edges. For certain other types of actions, such as PlayPrompt, an edge having a value of 0 indicates that the action completed successfully while an edge having a value of 1 indicates that the action did not complete successfully due to, for example, a voice channel problem. The Hup edge indicates that the caller hung up during the playing of the prompt.

There are 15 Destination fields 80 immediately beneath the 15 Edge Value fields 78, individual ones of the Destination fields 80 being logically associated with the Edge Value field 78 immediately above. The Destination fields 80 are filled in by the applications writer and indicate, for each of the Edge Value fields 78, a next state number of the state machine 60 on the occurrence of the associated edge value.

Figure 5:
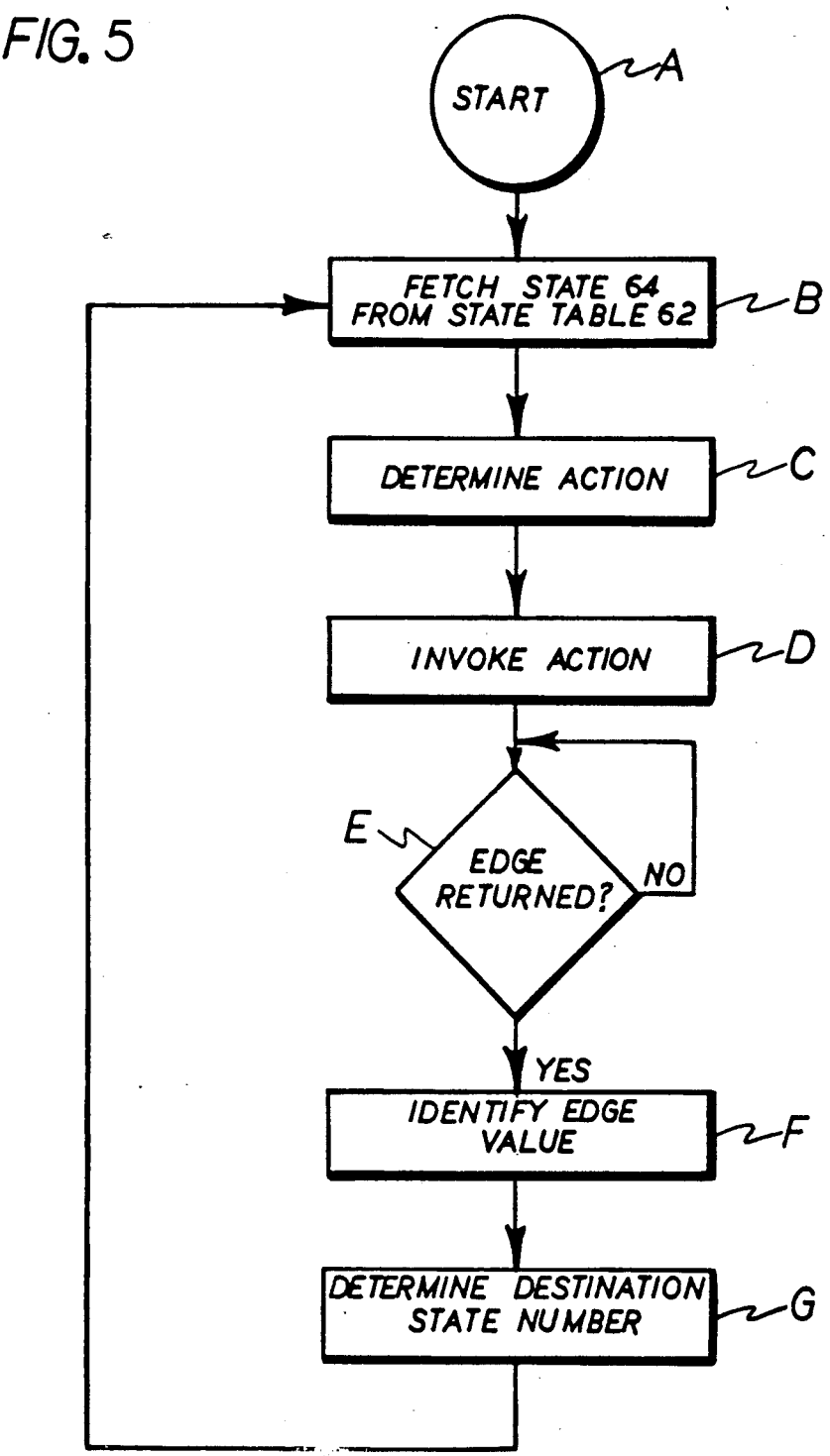
FIG. 5 is flow chart which illustrates the operation of the state machine.

Based upon the foregoing, the operation of the state machine 60 is shown in the flow chart of FIG. 5. As can be seen, after an initial start A the state machine 60 operates in a loop which executes the following steps. A state is fetched from the state table 62 (Block B) and the type of action required is determined from the Action field 74 (Block C). If the determined action requires parameters, the parameters are retrieved from the Parameters field 76. The action is invoked at Block D and the state machine 60 enters a loop at Block E to wait for an edge to be returned by the action. After the edge is returned, the state machine 60 identifies the edge value (Block F) and determines from the associated Destination field 80 the number of the next state (Block G). Flow returns to Block B where the destination state is fetched from the state table 62.

As an example, if a given state number has an action defined as PlayPrompt, the Destination field 80 associated with the 0 Edge Value field 78 is filled in by the applications writer to indicate the next state machine 60 state that is to occur on the successful playing of the prompt. The next consecutive Destination field 80 is filled in to indicate a desired next state on the occurrence of an unsuccessful playing of the prompt. The Hup Destination field would normally also be filled in to indicate a next state if the caller hangs up during the playing of the prompt. In accordance with this example the prompt may instruct the caller to depress one of the keys 0–3. The 0 Destination field may thus contain a state number associated with a GetKey action in order to determine which of the keys the caller depresses. The 1 Destination field may have a state number which is associated with a Disconnect action whereby the caller is disconnected due to a problem with the voice channel. The Hup Destination field may have a state number associated with the initial WaitforCall state. Assuming a successful execution of this first PlayPrompt action, a 0 edge is returned to the state machine 60 by the PlayPrompt action. The state machine 60 thereafter determines the next state number from the Destination field 80 associated with the 0 Edge Value field 78 and fetches this state from the state table 62. In accordance with this example the state number is associated with the GetKey action and the state machine 60 invokes the GetKey action. Sometime after the GetKey action is invoked by the state machine 60, an edge is returned by the action. For the state 64 associated with this GetKey action the applications writer has associated with each of the Edge Values 0–3 a number of a desired destination state. In this case, in that the values of the edges are not predetermined by the nature of the action, such as PlayPrompt, but are instead a function of the caller, the other keypad related Edge Values 4–9, * and # are preferably also associated with destination states. All of these other destination states may direct the state machine 60 to the same state. For example, they may all point to a PlayPrompt state which informs the user that his or her choice of keys was incorrect. This PlayPrompt state may have as a successful destination state the originally played prompt which once more requests the caller to depress one of the keys 0–3. The T1 state may invoke the same state number such that the prompt is repeated for some predetermined number of times while the T2 state may invoke a further prompt state that informs the caller that he or she is to be disconnected. This further prompt may have as a successful destination a state associated with a Disconnect action which in turn has as a destination the original WaitforCall state.

As can be appreciated the voice applications generator of the invention provides an intuitively simple means whereby an applications writer can define a complex voice application. During the entry of states by the application writer the state generator 68 of the VAG 12 preferably displays a data structure such as that shown in FIG. 4 and prompts the application writer for input. For example, the system displays a menu of all system defined actions, such as PlayPrompt and GetKey, to facilitate the entry by the applications writer. At the completion of state definition the state generator 68 verifies the completeness of the state generation process by checking that all Destination field 80 state numbers exist as numbered states within the state table 62. If a Destination state number is not found within the State number field 72 of a state 64 within the state table 62, the application writer is notified.

It can be seen that each of the system-defined actions is similar to a statement of a very high level programming language. That is, a relatively simple command (action) invokes a complex system operation which involves a plurality of lower level drivers and subroutines which interact with and control and receive status from, for example, the switch 14 and host 16. The applications writer is effectively isolated from these lower level system complexities; the writer instead interacting with the system at the much higher state machine level.

It is to be understood that the above described embodiment of the invention is illustrative only and that modifications throughout may occur to those skilled in the art. Accordingly, this invention is not to be regarded as limited to the embodiments disclosed herein, but is instead to be limited as defined by the appended claims.

What is claimed is:

1. Apparatus for performing at least one voice related application, comprising:
   means for storing information expressive of at least two states, the information including, for each of the states, a unique identification of the state, an identification of an action to be performed during the state, and an identification of at least one next state to be entered upon a termination of the action; and
   means for reading information expressive of a state from the storing means and for invoking the identified action, the reading and invoking means further including means for receiving a signal generated in response to an execution of the invoked action, the generated signal being indicative of an outcome of the action, the reading and invoking means further including means, responsive to the reception of the signal, for determining from the signal the identification of a next state, wherein for invoked actions the generated signal has one of a plurality of values associated therewith, and wherein the identification of the at least one state to be entered next upon a termination of the action includes, for each one of the plurality of outcomes associated with the action, an identification of a next state.

2. Apparatus as set forth in claim 1 wherein the reading and invoking means further comprises means for providing at least one parameter to an invoked action which requires at least one parameter, and wherein the information further includes information expressive of the at least one parameter.

3. Apparatus as set forth in claim 1 and including a plurality of storing means and associated reading and invoking means, the apparatus further including means for enabling the substantially concurrent operation of the plurality of storing means and associated reading and invoking means.

4. Apparatus as set forth in claim 1 wherein at least one of the actions transmits an audio signal to a phone line.

5. Apparatus as set forth in claim 4 wherein a transmitted audio signal includes voice signals.

6. In a data processing system, a method of enabling a user of the system to generate a voice related application, comprising the steps of:
   partitioning the application into at least two states, the step of partitioning including the steps of, for each of the states,
   inputting a state identification that uniquely identifies the state;
   inputting an identification of an action to be invoked during the state;
   inputting, if required, one or more parameters required by the identified action; and
   inputting an identification of at least one next state to be executed upon the termination of the identified action, wherein an action has a plurality of possible outcomes and wherein the step of inputting the identification of at least one next state is accomplished by entering the identification of a next state to be executed for each of the possible outcomes.

7. A method as set forth in claim 6 wherein the step of inputting an identification of an action is accomplished by selecting one of a plurality of predefined actions.

8. In a data processing system, a method of executing a voice related application, including the steps of:
   initially storing within a state table means at least two data structures, each of the data structures including fields expressive of a particular state of the application, the fields including a state identification field for uniquely identifying the state, an action field for specifying an action to be invoked during the state, the action having at least two possible outcomes, and at least two fields each of which is associated with one of the possible outcomes of the action, each of the at least two fields specifying an identification of a next state to be entered upon the termination of the specified action;
   reading one of the data structures from the state table means;
   invoking an action specified by the action field;
   identifying an outcome of the action when the action terminates;
   determining from the identified outcome and from the at least two fields an identification of a next state to be read from the state table means; and
   reading from the state table means the data structure associated with the determined next state.

9. A method as set forth in claim 8 wherein the step of invoking an action includes a further step of receiving an audio signal from a telephone line.

10. A method as set forth in claim 9 wherein the received audio signal includes a signal generated by the depression of a key on a telephone keypad.

11. A method as set forth in claim 10 wherein the step of invoking an action further includes a step of transmitting a voice signal to the telephone line.

12. A method as set forth in claim 11 wherein the transmitted voice signal is a prerecorded voice signal.

13. A system for executing a voice application comprising telephone switching means having a plurality of telephone circuits coupled thereto and a voice trunk comprising a plurality of signal lines; the system further comprising voice application generator means having a first data processing means and at least one second data processing means, the second data processing means being coupled to the at least one of the voice trunk signal lines and including memory means operable for storing at least two data structures, each of the data structures including fields expressive of a particular state of the voice application, the fields including a state identification field for uniquely identifying the state, an action field for specifying an action to be accomplished during the state, the action having at least two possible outcomes, the specified action being selected from a group of actions including at least one action that causes information to be transmitted to or received from the at least one of the voice trunk signal lines, and at least two fields each of which is associated with one of the possible outcomes of the action, each of the at least two fields specifying an identification of a next state to be entered upon the termination of the specified action, the second data processing means further including state machine means coupled to the memory means for reading the data structures therefrom, the state machine means including means for invoking an action specified by the action field, means for identifying an outcome of the action when the action terminates, means for determining from the identified outcome and from the at least two fields an identification of a next state to be read from the memory means, and means for reading from the memory means the data structure associated with the determined identification.

14. A system as set forth in claim 13 and further comprising third data processing means coupled to the first data processing means for at least providing information to the first data processing means for transmission to the second data processing means, the information being transmitted by the second data processing means to the at least one voice trunk signal line.

15. A system as set forth in claim 13 wherein the second data processing means is coupled to a plurality of the voice trunk signal lines and further includes a plurality of state machine means and associated memory means, the second data processing means further including dispatching means for enabling substantially concurrent operation of the plurality of state machine means.

16. A system as set forth in claim 15 wherein the voice application generator means comprises a plurality of second data processing means each of which is coupled to at least one of the plurality of voice trunk signal lines.

* * * * *